United States Patent [19]
Sakai

[11] Patent Number: 5,307,293
[45] Date of Patent: Apr. 26, 1994

[54] APPARATUS FOR MEASURING SPEED

[75] Inventor: Izumi Sakai, Solihull, Great Britain

[73] Assignee: Lucas Industries Public Limited Company, England

[21] Appl. No.: 881,838

[22] Filed: May 12, 1992

[30] Foreign Application Priority Data

May 31, 1991 [GB] United Kingdom ............... 9111702

[51] Int. Cl.$^5$ .............................................. G01P 3/36
[52] U.S. Cl. ................................................. 364/565
[58] Field of Search ................ 364/565; 250/550, 560, 250/553

[56] References Cited

U.S. PATENT DOCUMENTS

| | | | |
|---|---|---|---|
| 4,282,511 | 8/1981 | Southgate | 250/550 |
| 4,659,937 | 4/1987 | Cielo et al. | 250/560 |
| 4,923,298 | 5/1990 | Dopheide et al. | 250/553 |
| 4,927,263 | 5/1990 | de Groot et al. | 250/550 |
| 5,172,000 | 12/1992 | Scheff et al. | 250/550 |

Primary Examiner—Kevin J. Teska
Assistant Examiner—Thomas Peeso
Attorney, Agent, or Firm—Andrus, Sceales, Starke & Sawall

[57] ABSTRACT

An apparatus for measuring speed with respect to an object comprises first to Nth sensors sensitive to energy received from first to Nth consecutive regions, respectively, of the object. Signal delay means are provided to delay the signals from the second to Nth sensors, the delay increasing with sensor number. A subtractor is provided to form the difference between the sum of the signals of the even-numbered sensors and the sum of the signals of the odd-numbered sensors.

19 Claims, 3 Drawing Sheets

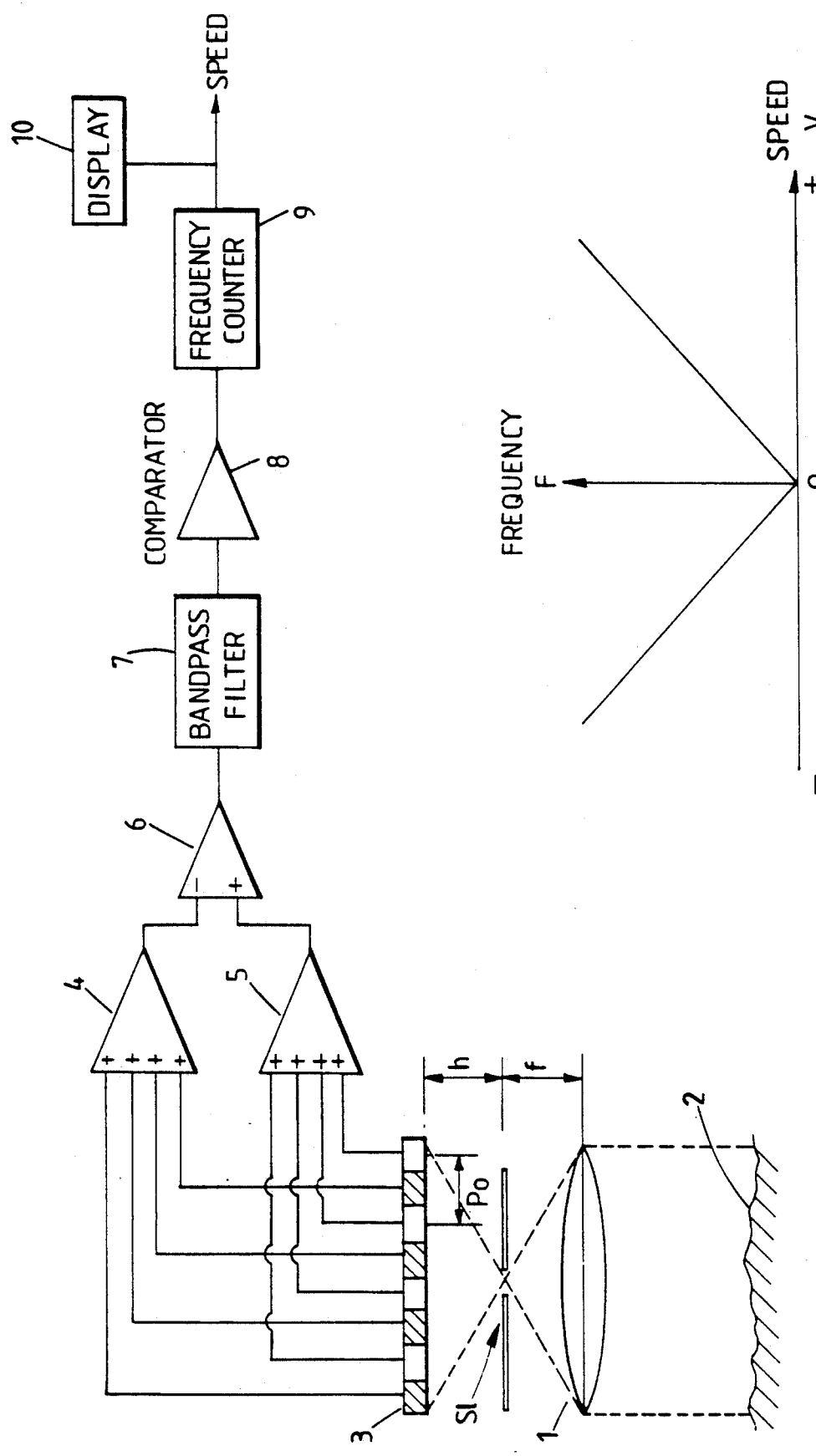

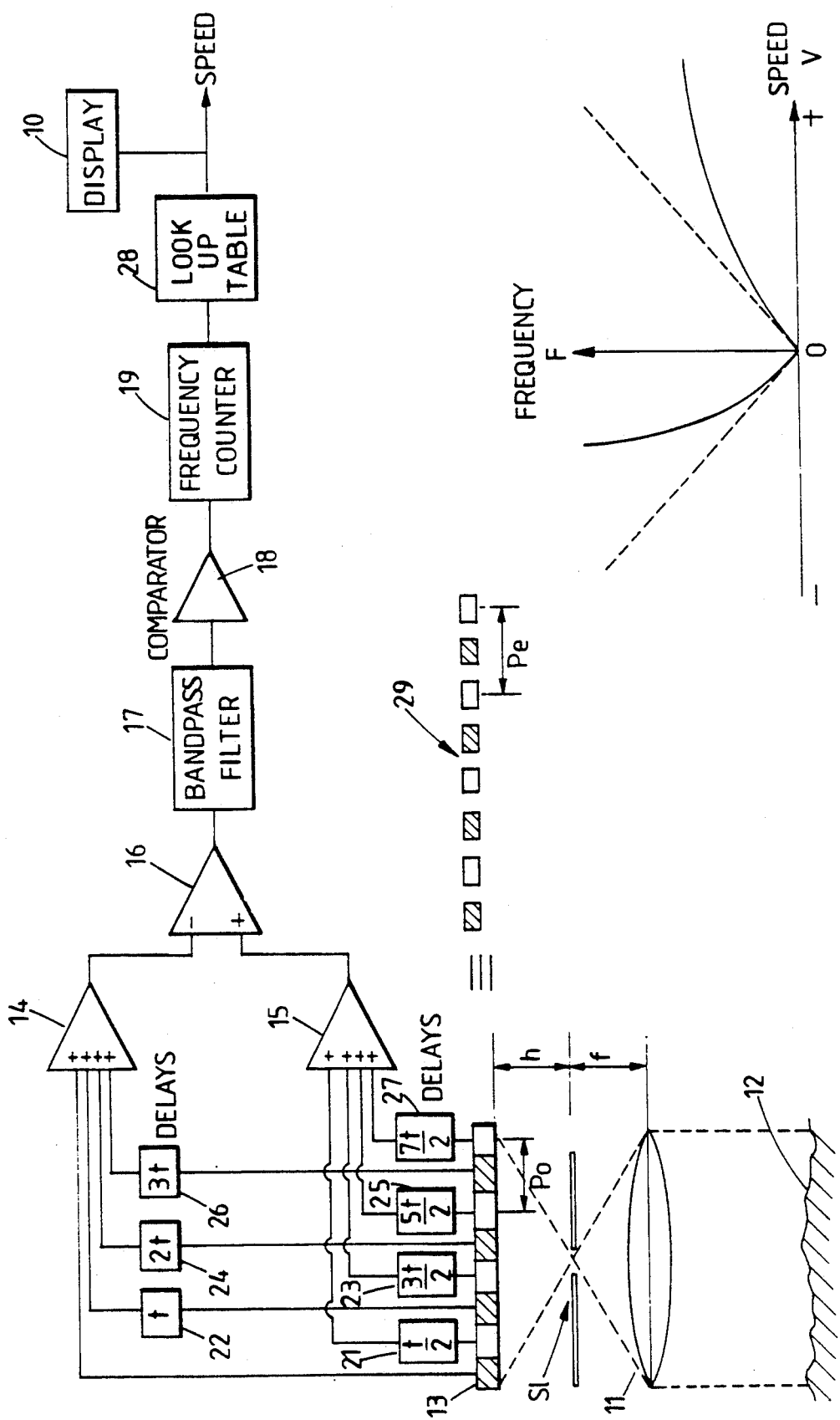

APPARATUS FOR MEASURING SPEED

The present invention relates to an apparatus for measuring speed. Such an apparatus may be used to provide speed over ground measurement for a vehicle.

FIG. 1 of the accompanying drawings illustrates a known type of speed over ground measuring system which may be used to measure the speed of a vehicle with respect to the ground. The apparatus comprises an imaging system, shown as a converging lens 1 and slit S1, which form an optical image of a portion 2 of the ground beneath the vehicle on a linear array of opto-electric transducers 3. FIG. 1 illustrates an array of eight transducers 3 which act as a spatial filter having a pitch Po.

The imaging system has a magnification factor $a = h/f$, where f is the focal length of the system and h is the distance between the focus and the array of transducers 3.

Counting from the left in FIG. 1, the odd numbered transducers 3 are connected to respective inputs of an adder 4 whereas the even numbered transducers are connected to the inputs of an adder 5. The outputs of the adders 4 and 5 are connected to the negative and positive inputs, respectively, of a subtracter 6. The adders 4 and 5 and the subtracter 6 may be embodied as operational amplifier circuits. The output of the subtracter 6 is connected to the input of a band-pass filter 7, whose output is connected to the input of a comparator 8, for instance configured as a zero crossing detector. The output of the comparator 8 is connected to a frequency counter 9, whose output provides a signal representing speed over ground. The output of the counter 9 may be supplied to other vehicle systems, such as traction control systems and anti-lock brake systems.

A display 10 is shown connected to the output of the counter 9 for providing a visual indication of vehicle speed over ground.

As is well known, the output frequency F of the comparator 8 is linearly related to vehicle speed by the following formula:

$$F = aFo|v| \quad (1)$$

where a is the magnification factor h/f, Fo is the spatial frequency (1/Po) of the spatial filter formed by the array of transducers 3, and $|v|$ is the absolute value of the vehicle speed v. This linear relationship is illustrated in the graph of frequency F against speed v shown in FIG. 2 of the accompanying drawings.

The bandwidth of the band-pass filter 7 has to be sufficiently wide to pass signals with frequencies lying within the range of speeds of which the vehicle is capable, typically between 0 and 10 kHz. However, it is desirable to restrict the bandwidth so as to reject noise and provide as clean a signal as possible to the comparator 8 in order to avoid spurious speed measurements. In practice, a relatively wide bandwidth is necessary, so that the speed measurement is affected by noise within this relatively wide bandwidth.

As is apparent from the above formula and from FIG. 2, the apparatus of FIG. 1 cannot discriminate between forward and backward movement of the vehicle. The transfer function between speed and frequency is symmetrical about the vertical frequency axis so that each frequency corresponds to movement of the vehicle at a given speed either forwards or backwards.

JP62-112069 discloses an arrangement similar to that shown in FIG. 1 but in which the pitch, and hence the spatial frequency, of the array of transducers 3 can effectively be altered for different speed ranges. In this known system, the pitch is changed by selecting elements from a large linear array with the interval between selected elements being dependent on speed. Thus, as the speed rises, the selected transducer pitch is increased. The spatial frequency of the transducer array is thus reduced and hence the output frequency is reduced so as to limit the range of frequencies to a smaller bandwidth. It is thus possible to restrict the bandwidth of the filter 7 in order to reject more noise.

However, this arrangement is relatively expensive as many opto-electric transducers are required. Also, the system is relatively complex as speed has to be measured before a suitable pitch of the spatial filter can be selected. Further, this known arrangement cannot discriminate between forward and backward movement of the vehicle.

According to the invention, there is provided an apparatus for measuring speed with respect to an object, comprising first to Nth sensors arranged to be sensitive to energy received from first to Nth consecutive regions, respectively, of the object, where N is an integer greater than 1; delay means for delaying signals from at least the second to Nth sensors such that the time delay of each ith sensor signal is greater than the time delay of each (i-1)th sensor signal for $1 < i \leq N$; and first means for forming the difference between the sum of the delayed signals of the even-numbered sensors and the sum of the delayed signals of the odd-numbered sensors.

The sensors may be of any suitable type sensitive to energy emitted by, reflected from, or transmitted through the object, for instance the ground in a speed over ground measuring apparatus. For sensing reflected energy, means for irradiating the object with energy may be provided if ambient radiation is not always sufficient. The sensors may, for instance, be sensitive to electro-magnetic radiation and may comprise opto-electric or microwave sensors, or may be sensitive to acoustic radiation and may comprise ultrasonic sensors. Suitable imaging means may be provided for imaging the N consecutive regions onto the sensors.

Preferably N is an even integer greater than 2.

Opto-electric sensors may be provided as individual sensors or as elements within a device, for instance as elements within a charge coupled device, CCD, photo-sensitive array.

Preferably the delay means is arranged to provide time delays of the signals from the second to Nth sensors which increase in an arithmetic progression i.e. the differences between time delays of consecutive pairs of sensors is equal.

The first to Nth regions may be arranged as a linear array for providing linear speed measurement or may be arranged as a curved one dimensional array for measuring relative rotary speed.

Preferably the output of the difference forming means is connected to the input of a band-pass filter. Preferably the output of the filter is connected to the input of a comparator. Preferably the apparatus includes a frequency measuring device, such as a frequency counter. The output of the device may be connected to the input of a look-up table or to a data processor for providing an output which is linearly related to speed. The output of the look-up table or of the data processor may, for instance, be supplied to a display for giving a visual indication of speed.

Preferably the apparatus comprises second means for forming the difference between the sum of the signals of the even-numbered sensors and the sum of the signals of the odd-numbered sensors, and means for comparing the phases or frequencies of the differences formed by the first and second difference forming means. There may be provided a second look-up table and means for selecting between the first and second look-up tables in accordance with the comparison between the phases or frequencies.

Alternatively, if a data processor is usual to convert measured frequency to relative speed, the data processor may perform the conversion for both directions of relative movement.

If a CCD array having a serial data output is used, the delay means may be arranged to provide the delays by controlling the serial data output rate such that the times between reading consecutive elements is equal to the time delays. Alternatively the output of the CCD array may be connected to a delay means.

The CCD array may be read at differing rates or the order in which the data is read may be reversed to provide an apparatus capable of distinguishing between directions of relative movement in addition to measuring the relative speed.

The invention will be further described, by way of example, with reference to the accompanying drawings, in which:

FIG. 1 is a block schematic diagram of a known type of speed over ground measuring apparatus;

FIG. 2 is a graph of frequency against speed illustrating the transfer function of the apparatus of FIG. 1;

FIG. 3 is a block schematic diagram of a speed over ground measuring apparatus constituting an embodiment of the invention;

FIG. 4 is a graph of frequency against speed illustrating the transfer function of the apparatus of FIG. 3.

Figure 5:
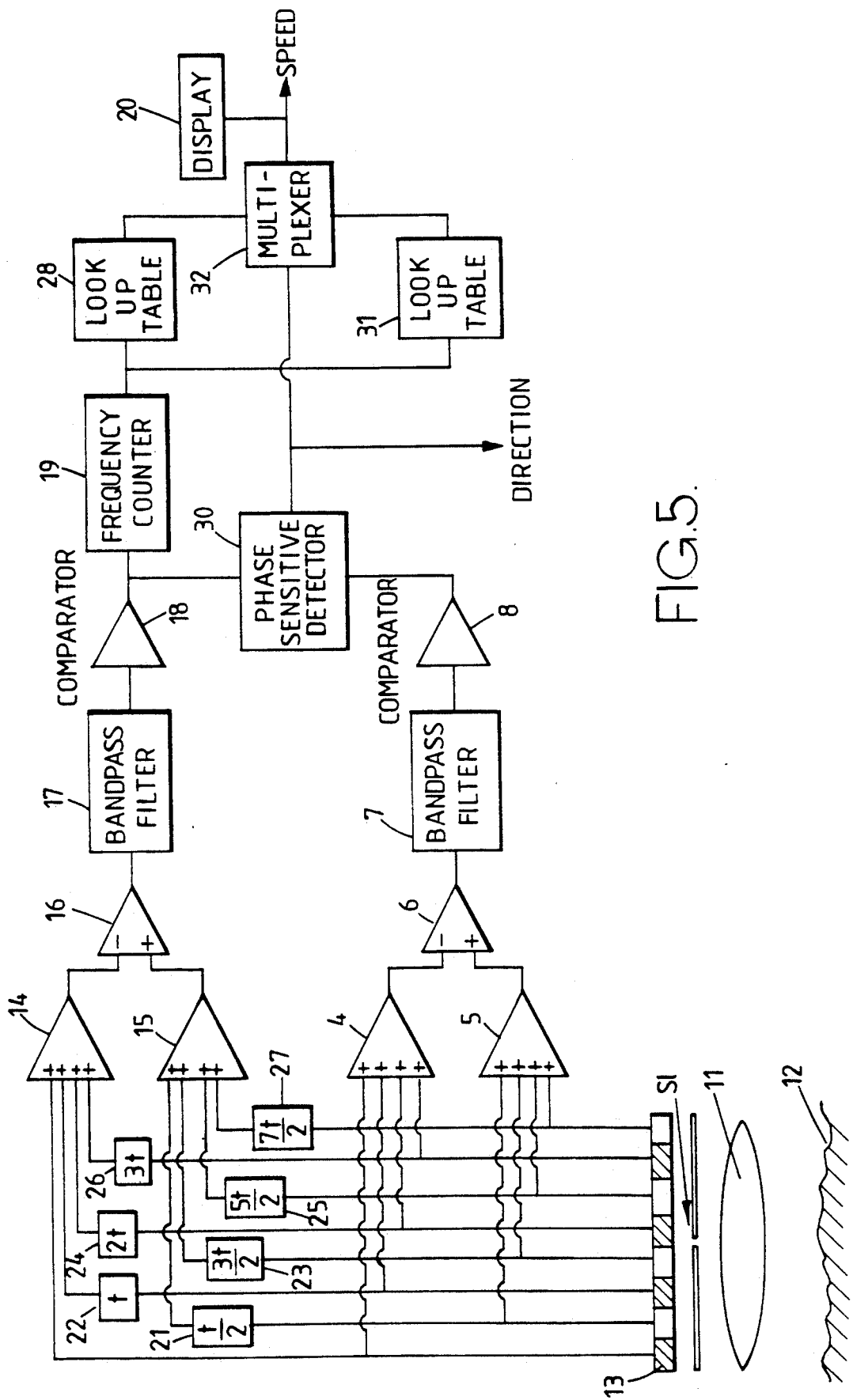
FIG. 5 is a block schematic diagram of a speed over ground measuring apparatus constituting a further embodiment of the invention.

The apparatus shown in FIG. 3 comprises an imaging system 11 including a slit S1, a portion 12 of the ground, a linear array of opto-electric transducers 13, adders 14 and 15, a subtracter 16, a band-pass filter 17, a comparator 18, a frequency counter 19, and a display 20 which correspond to the elements 1 to 10, respectively, of FIG. 1. Those elements which are substantially identical will not therefore be further described.

The first opto-electric transducer is connected directly to an input of the adder 14. The remaining transducers of the array are connected via respective delay circuits 21 to 27 which delay the transducer output signals by time delays t/2 to 7t/2, respectively.

The apparatus of FIG. 3 differs further from the apparatus of FIG. 1 in that the bandwidth of the band-pass filter 17 is narrower and a look-up table 28, for instance comprising a read-only memory storing the table values, is connected to the output of the frequency counter such that the counter 19 addresses the look-up table 28 whose outputs represent speed.

The output frequency F from the comparator 18 is given by the following formula:

$$F = aFe|v| \quad (2)$$

where a is the magnification factor h/f, Fe is the effective frequency of the spatial filter defined by the array of transducers 13 and the delays 21 to 27, and $|v|$ is the absolute value of speed over ground. This formula is equivalent to the corresponding one given hereinbefore for the apparatus of FIG. 1, but differs in that the effective spatial frequency Fe is equal to 1/Pe, where Pe is the effective pitch of the spatial filter and varies with speed. The effective pitch is given by the formula:

$$Pe = Po + avt \quad (3)$$

Thus, the output frequency is given by the formula:

$$F = (aFo|v|)/(|1 + aFotv|) \quad (4)$$

As is apparent from this formula, output frequency is no longer linearly related to the speed; the transfer function is now speed dependent. The graph of FIG. 4 illustrates in continuous lines this transfer function. For comparison, the transfer function of FIG. 2 for the known apparatus of FIG. 1 is shown in broken lines. For relatively low forward speeds, the output frequencies of the apparatuses of FIGS. 1 and 2 are similar with that of the apparatus of FIG. 3 being somewhat lower for each speed. As speed increases in the forward direction, the rate of increase of frequency with respect to speed reduces and eventually becomes asymptotic to a frequency of 1/t. Thus, in the forward direction, the range of frequencies presented to the band-pass filter 17 is substantially reduced compared with the known arrangement of FIG. 1 and the bandwidth of the filter 17 may therefore be made more narrow so as to provide better rejection of noise.

In the reverse direction, frequency increases more rapidly with speed than for the known arrangement of FIG. 1. However, this is not generally important for vehicle speed over ground measurement, as most vehicles are capable of only relatively low speeds in the backwards or reverse direction.

In order to linearise the relationship between the output of the frequency counter 19 and speed, the look-up table 28 may be provided in the form of a read-only memory. The memory contains a table representing values of the inverse function of the above described function relating output frequency to speed, so that the output of the table 28 is linearly related to vehicle speed. Alternatively, a data processor may perform the inverse function in accordance with a stored program.

Equation 4 can be rearranged to relate relative speed to the output frequency of the spatial filter.

For movement in the forward direction, that is V > 0 as shown in FIG. 4, the speed can be calculated using $$V = \frac{F}{aFo(1 - Ft)} \quad (5)$$

For motion in a reverse direction, V < 0, two possibilities exist depending upon the speed. For speeds V between 0 and $$-\frac{1}{aFot}.$$

V can be calculated from $$V = -\frac{F}{aFo(1 + Ft)} \quad (6)$$

and for reverse speeds faster than $$-\frac{1}{aF_o t}.$$

V is calculated using $$V = \frac{F}{aF_o(1 - Ft)} \quad (7)$$

As illustrated at 29 in FIG. 3, the presence of the delay circuits 21 to 27 has the effect of varying the effective pitch, and hence the spatial frequency, of the filter formed by the array of transducers 13. For forward motion of the vehicle, the effective pitch Pe is, as shown, greater than the geometrical pitch Po of the transducer array, with the effective pitch increasing with forward speed.

As is apparent from FIG. 4, the transfer function of the apparatus of FIG. 3 is not symmetrical about the vertical frequency axis. This makes it possible to discriminate between forward and reverse movement of the vehicle with respect to the ground 12. In particular, for forward movement, the frequency of the comparator output of the apparatus of FIG. 3 is less than the frequency of the output of the comparator 8 in FIG. 1. Correspondingly, the phase of the comparator output in FIG. 3 lags behind the phase of the comparator output in FIG. 1. Conversely, for reverse movement, the frequency of the comparator output in FIG. 3 is greater than that of FIG. 1 and the phase of the former leads that of the latter.

FIG. 5 shows an apparatus which is capable of measuring both speed and direction of movement. This apparatus represents a combination of the apparatuses shown in FIGS. 1 and 3, and like reference numerals refer to like elements. Thus, the adders 4 and 5 receive the direct outputs of the transducers 13 whereas the adders 14 and 15 receive the delayed outputs of the second to eighth transducers via the delays 21 to 27. The outputs of the comparators 8 and 18 are supplied to the inputs of a phase sensitive detector 30, which produces an output signal indicative of the direction of movement. The output of the frequency counter 19 is connected to the address inputs of the read-only memory forming the look-up table 28. In addition, the outputs of the frequency counter 19 are connected to the address inputs of another read-only memory forming a further look-up table 31. The look-up table 31 represents the inverse of the transfer function for reverse movement.

The outputs of the look-up tables 28 and 31 are connected to respective inputs of a multiplexer 32 which is controlled by the direction signal from the phase sensitive detector 30. Thus, depending on the direction of movement as detected by the detector 30, the multiplexer 32 supplies at its output the appropriate speed measurement which is displayed by the display 20 and supplied to other vehicle systems.

The look-up tables 28 and 31 and the multiplexer 32 may be replaced by a data processor. The data processor may be arranged to perform a calculation of speed in a forward direction using equation 5, and calculation of speed in a reverse direction using equation 6.

The linear array of opto-electric transducers 13 may be replaced by a charged coupled device having an array of photo-sensitive elements. Data may be read serially from the device. The read rate may be selected to introduce a time delay t/2 between consecutive elements. The data is divided into two groups corresponding to signals from the even numbered transducers and the odd numbered transducers of the array 13.

The read rate is chosen such that sufficient data samples are taken to give reliable speed readings over the range of speeds that the apparatus is required to measure.

An embodiment able to distinguish between forward and reverse motion may be implemented using a CCD array. The array may be read at differing read rates and the results compared to establish the direction of motion. Alternatively the array may be read in opposing directions and the results compared to indicate direction of travel.

It is therefore possible to provide a speed over ground measuring apparatus which does not require any additional transducers compared with the known apparatus shown in FIG. 1. The effective spatial frequency of the transducer array varies automatically with vehicle speed and it is possible to discriminate between forward and reverse movement. The range of frequencies corresponding to forward movement produced by the apparatus is limited compared with the prior art, which allows more effective filtering to be provided so as to reduce the effects of noise.

Various modifications may be made within the scope of the invention. For instance, although the delay circuits 21 to 27 are shown as providing constant delays, these delays may be made to vary, for instance in accordance with speed and/or direction. Also, although the outputs of the transducers 13 are shown as contributing equally i.e. the transducers have substantially the same conversion gain, the contributions of the transducers may be weighted, for instance to increase the contributions of the middle transducers relative to the end transducers. This may be achieved by connecting the outputs of the transducers to amplifiers or attenuators having different gains or attenuations, by using transducers having different sensitivities, by placing slits of different widths in front of the transducers, or in any other suitable way.

I claim:

1. An apparatus for measuring speed with respect to an object, comprising first and Nth sensors where N is greater than two arranged to be sensitive to energy received from first to Nth consecutive regions, respectively, of the object to form sensor signals, signal delay means for forming delayed signal by delaying the sensor signals from at least said second to Nth sensors such that a time delay for each ith of the sensor signal is greater than a time delay for each (i-1)th of the sensor signals for $1 < i \leq N$, and first difference forming means for forming a difference between a sum of the delayed signals of ever numbered ones of said sensors and a sum of the delayed signals of odd numbered ones of said sensors.

2. An apparatus as claimed in claim 1, in which N is an even integer.

3. An apparatus as claimed in claim 2, in which said signal delay means are arranged to provide time delays of the sensor signals from the second to Nth sensors which increase in arithmetic progression.

4. An apparatus as claimed in claim 1, further comprising a band-pass filter having an input and an output, said first difference forming means having an output connected to said input of said band-pass filter.

5. An apparatus as claimed in claim 4, further comprising a comparator having a signal input and an output, said input of said comparator being connected to said output of said band-pass filter.

6. An apparatus as claimed in claim 5, in which said comparator is a zero crossing detector.

7. An apparatus as claimed in claim 1, further comprising a frequency measuring device for measuring the frequency of the output of said first difference forming means.

8. An apparatus as claimed in claim 5, further comprising a frequency measuring device for measuring the frequency of the output of said comparator and a look-up table having an address input and an output, said frequency measuring device having an output connected to said address input of said look-up table, and said look-up table being arranged to provide an output signal at said output which is substantially linearly related to speed.

9. An apparatus as claimed in claim 1, further comprising second difference forming means for forming a difference between a sum of the sensor signals of even-numbered ones of said sensors and a sum of the sensor signals of odd-numbered ones of said sensors, and frequency comparing means for comparing the frequencies of the differences formed by said first difference forming means and said second difference forming means to generate a direction signal.

10. An apparatus as claimed in claim 9, further comprising first and second look-up tables having respective address inputs and respective outputs, a frequency measuring device having an input connected to said first difference forming means and an output connected to said respective address inputs of said first and second look-up tables, and means responsive to the direction signal for selecting between said first and second look-up tables.

11. An apparatus as claimed in claim 10, in which said first and second look-up tables are arranged to produce signals at said respective outputs substantially linearly related to speed in first and second directions, respectively.

12. An apparatus as claimed in claim 1, further comprising second difference forming means for forming a difference between a sum of the sensor signals of even-numbered ones of said sensors and a sum of the sensor signals of odd-numbered ones of said sensors, and phase comparing means for comparing the phases of the differences formed by said first difference forming means and said second difference forming means to generate a direction signal.

13. An apparatus as claimed in claim 12, further comprising first and second look-up tables having respective address inputs and respective outputs, a frequency measuring device having an input connected to said first difference forming means and an output connected to said respective address inputs of said first and second look-up tables, and means responsive to the direction signal for selecting between said first and second look-up tables.

14. An apparatus as claimed in claim 13, in which said first and second look-up tables are arranged to produce signals at said respective outputs substantially linearly related to speed in first and second directions, respectively.

15. An apparatus as claimed in claim 1, in which said sensors are optical sensors.

16. An apparatus as claimed in claim 1, in which said sensors are ultrasonic sensors.

17. An apparatus as claimed in claim 1, in which said sensors are arranged in a linear array for measuring linear relative movement.

18. An apparatus as claimed in claim 1, in which said sensors are arranged in a curved one dimensional array for measuring relative rotary movement.

19. A vehicle speed measuring apparatus including an apparatus as claimed in claim 1.

* * * * *

UNITED STATES PATENT AND TRADEMARK OFFICE
CERTIFICATE OF CORRECTION

PATENT NO. : 5,307,293
DATED : April 26, 1994
INVENTOR(S) : Izumi Sakai

It is certified that error appears in the above-indentified patent and that said Letters Patent is hereby corrected as shown below:

Claim 1, column 6, line 51, delete "signal " and substitute therefor --signals--;

Claim 1, column 6, line 55, delete "ever" and substitute therefor --even--.

Signed and Sealed this

Twenty-third Day of August, 1994

Attest:

BRUCE LEHMAN

Attesting Officer        Commissioner of Patents and Trademarks